US012614878B2

(12) United States Patent
Bai et al.

(10) Patent No.: US 12,614,878 B2
(45) Date of Patent: Apr. 28, 2026

(54) RING-SHAPED SHRAPNEL STRUCTURE OF H-MTD MALE CONNECTOR

(71) Applicant: Shenzhen Alex Connector Co Ltd, Shenzhen (CN)

(72) Inventors: Long Bai, Shenzhen (CN); Haiqiu Lu, Shenzhen (CN); Xiaoan Wang, Shenzhen (CN); Qi Peng, Shenzhen (CN)

(73) Assignee: Shenzhen Alex Connector Co Ltd, Shenzhen (CN)

(*) Notice: Subject to any disclaimer, the term of this patent is extended or adjusted under 35 U.S.C. 154(b) by 372 days.

(21) Appl. No.: 18/336,588

(22) Filed: Jun. 16, 2023

(65) Prior Publication Data

US 2024/0128688 A1 Apr. 18, 2024

(30) Foreign Application Priority Data

Oct. 17, 2022 (CN) ......................... 202222725072.5

(51) Int. Cl.
*H01R 13/6581* (2011.01)
*H01R 13/50* (2006.01)

(52) U.S. Cl.
CPC ......... *H01R 13/6581* (2013.01); *H01R 13/50* (2013.01)

(58) Field of Classification Search
CPC ........... H01R 13/6581; H01R 13/6583; H01R 13/6584; H01R 13/6593
USPC ..................................................... 439/607.01
See application file for complete search history.

(56) References Cited

U.S. PATENT DOCUMENTS

| | | | | |
|---|---|---|---|---|
| 9,722,342 | B2 | 8/2017 | Yuan et al. | |
| 10,008,796 | B1 | 6/2018 | Wang et al. | |
| 10,944,218 | B2 | 3/2021 | Lödding | |
| 11,245,232 | B2 | 2/2022 | Oosaka | |
| 2005/0124217 | A1* | 6/2005 | Zhuang | H01R 12/7088 439/607.03 |
| 2018/0366856 | A1* | 12/2018 | Pemwieser | H01R 13/111 |
| 2019/0288458 | A1* | 9/2019 | Lödding | H01R 13/6581 |
| 2021/0057853 | A1* | 2/2021 | Droesbeke | H01R 4/72 |
| 2021/0057854 | A1* | 2/2021 | Droesbeke | H01R 9/0518 |
| 2022/0013973 | A1* | 1/2022 | Zebhauser | H01R 24/40 |
| 2023/0318234 | A1* | 10/2023 | Evans | H01R 13/65914 439/567 |

* cited by examiner

*Primary Examiner* — Abdullah A Riyami
*Assistant Examiner* — Amara Anderson

(57) ABSTRACT

A ring-shaped shrapnel structure of a High-Speed Modular Twisted Pair Data (H-MTD) male connector, including a housing, a ring-shaped sheet, and a shrapnel. The housing is a stepped hollow structure. The ring-shaped sheet is connected to the front end of the housing. The shrapnel in an arch-shape protrudes and is arranged on the ring-shaped sheet. The structure uses a split design to separate the shrapnel from the housing, thereby reducing production difficulties and improving yields, while complementing the shielding effect of the connector.

9 Claims, 2 Drawing Sheets

RING-SHAPED SHRAPNEL STRUCTURE OF H-MTD MALE CONNECTOR

TECHNICAL FIELD

The utility model relates to the field of a connector, and in particular, to a ring-shaped shrapnel structure of a High-Speed Modular Twisted Pair Data (H-MTD) male connector.

TECHNICAL BACKGROUND

An H-MTD male connector in the prior art has a one-piece design. The side wall opening in a housing is provided with a grounded shrapnel structure. Such a structure requires an opening in the housing, which destroys the structure of the housing. The housing has a poor shielding effect. The structure of the one-piece design has inconvenience in maintenance and replacement, which is easy to increase manufacturing costs.

SUMMARY

The utility model provides a ring-shaped shrapnel structure of an H-MTD male connector, which aims to solve the existing problems of poor shielding effect of a structure of an H-MTD male connector in the prior art and the problem of difficult maintenance and replacement.

The utility model provides a ring-shaped shrapnel structure of an H-MTD male connector, including a housing, a ring-shaped sheet, and a shrapnel. The housing is a stepped hollow structure. The ring-shaped sheet is connected to the front end of the housing. The shrapnel in an arch-shape protrudes and is arranged on the ring-shaped sheet.

As a further improvement of the utility model, the housing includes a first connecting block, a second connecting block, and a third connecting block. One end of the first connecting block is connected to one end of the second connecting block. One end of the third connecting block is connected to the other end of the second connecting block.

As a further improvement of this utility model, the first connecting block has a caliber larger than that of the second connecting block. The second connecting block has a caliber larger than that of the third connecting block.

As a further improvement of the utility model, the ring-shaped sheet is connected to the second connecting block and arranged close to the third connecting block.

As a further improvement of the utility model, the middles of the first connecting block, the second connecting block, and the third connecting block are intercommunicated.

As a further improvement of the utility model, the ring-shaped sheet is provided thereon with a mounting hole. The two ends of the shrapnel are connected to the two ends of the mounting hole.

As a further improvement of the utility model, the shrapnel is provided at the top, the bottom as well as the left and right sides of the ring-shaped sheet.

As a further improvement of the utility model, the shrapnel and the ring-shaped sheet are integrally molded.

The utility model has the following beneficial effects: the structure uses a split design to separate the shrapnel from the housing, thereby reducing production difficulties and improving yields, while complementing the shielding effect of the connector.

Figure 1:
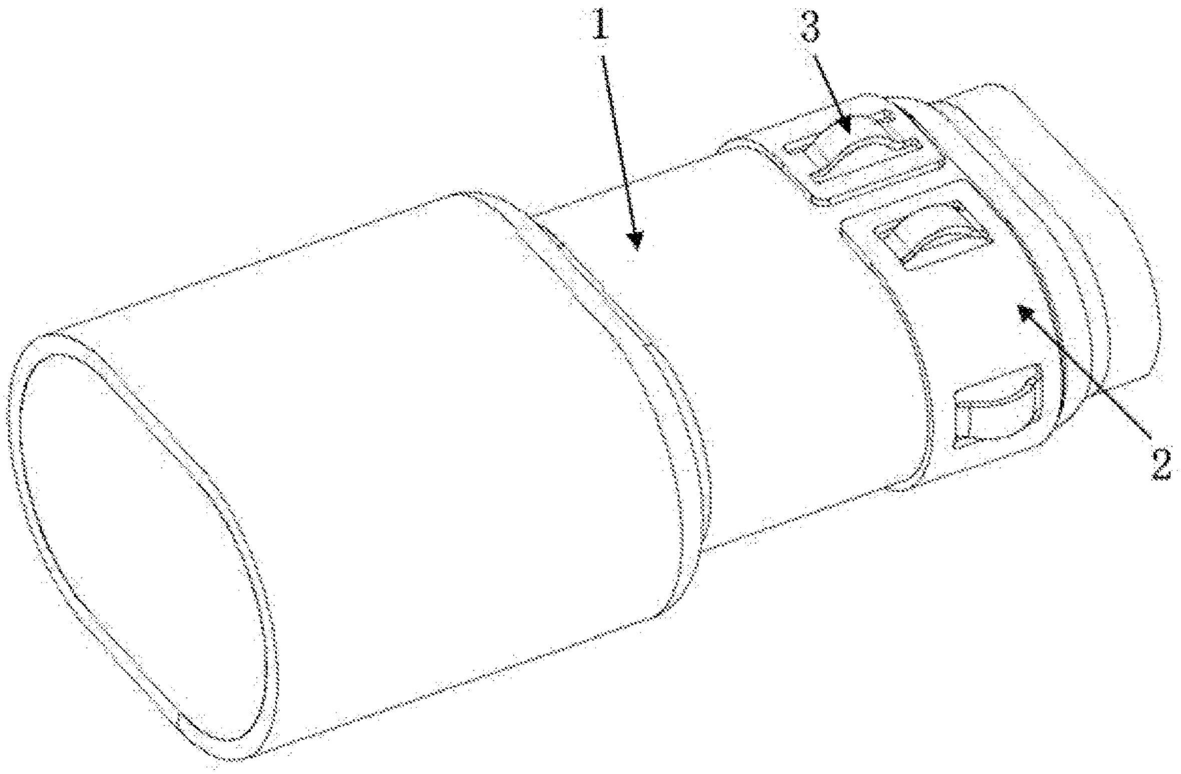
FIG. 1 is an overall view of the utility model.

Reference signs: 1—housing, 2—ring-shaped sheet, 3—shrapnel, 4—mounting hole, 11—first connecting block, 12—second connecting block, 13—third connecting block.

DETAILED DESCRIPTION OF EMBODIMENTS

To make the objectives, technical solutions, and advantages of the utility model clearer, the utility model will be further described in detail hereinafter in combination with the drawings and embodiments. It should be noted that the words “front”, “back”, “left”, “right”, “top”, and “bottom” used in the following description refer to the directions in the drawings, while the words “bottom” and “top”, “inside” and “outside” refer to the directions toward or away from the geometric center of a particular part, respectively.

Figure 2:
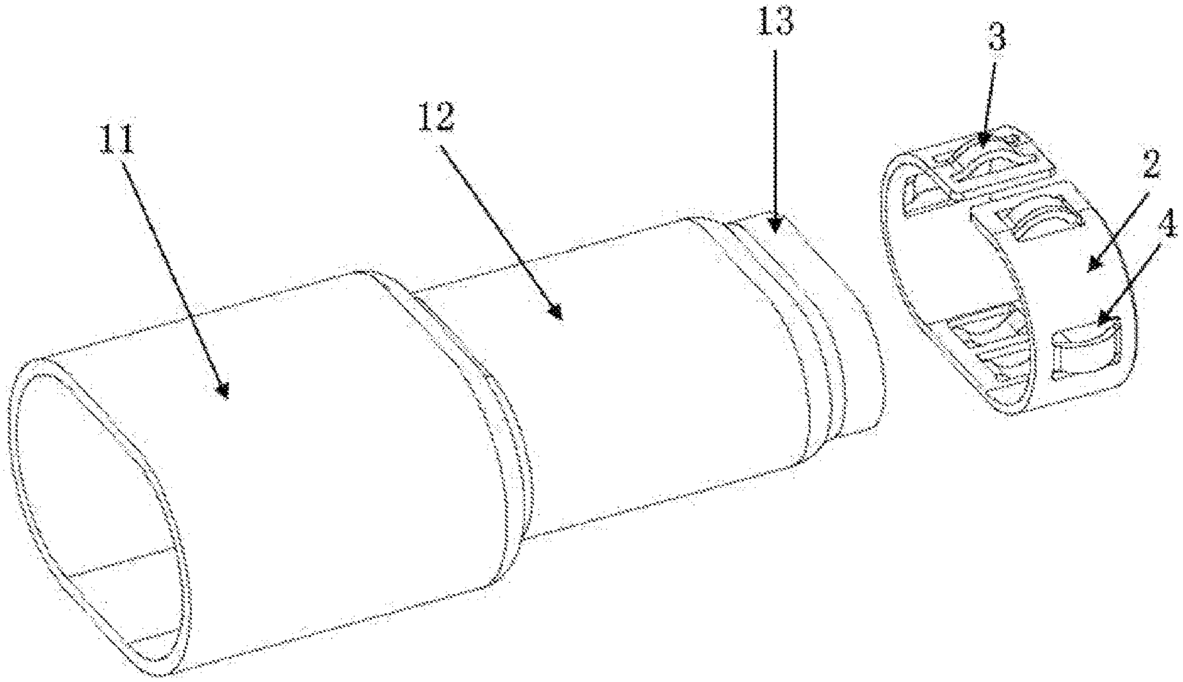
FIG. 2 is an exploded view of the utility model.

As shown in FIGS. 1-2, the utility model provides a ring-shaped shrapnel structure of an H-MTD male connector, including a housing 1, a ring-shaped sheet 2, and a shrapnel 3. The housing 1 is a stepped hollow structure. The ring-shaped sheet 2 is connected to the front end of the housing 1. The shrapnel 3 in an arch-shape protrudes and is arranged on the ring-shaped sheet 2.

As an embodiment of the utility model, the housing 1 includes a first connecting block 11, a second connecting block 12, and a third connecting block 13. One end of the first connecting block 11 is connected to one end of the second connecting block 12. One end of the third connecting block 13 is connected to the other end of the second connecting block 12.

As another embodiment of this utility model, the first connecting block 11 has a caliber larger than that of the second connecting block 12. The second connecting block 12 has a caliber larger than that of the third connecting block 13.

As another embodiment of the utility model, the ring-shaped sheet 2 is connected to the second connecting block 12 and arranged close to the third connecting block 13.

As another embodiment of the utility model, the middles of the first connecting block 11, the second connecting block 12 and the third connecting block 13 are intercommunicated.

As another embodiment of the utility model, the ring-shaped sheet 2 is provided thereon with a mounting hole 4. The two ends of the shrapnel 3 are connected to the two ends of the mounting hole 4.

As another embodiment of the utility model, the shrapnel 3 is provided at the top, the bottom as well as the left and right sides of the ring-shaped sheet 2.

As another embodiment of the utility model, the shrapnel 3 and the ring-shaped sheet 2 are integrally molded.

The utility model provides a ring-shaped shrapnel structure of an H-MTD male connector. The structure uses a split design to separate the shrapnel 3 from the housing 1, thereby reducing production difficulties and improving yields, while complementing the shielding effect of the connector.

In this structure, the housing 1 consists of three connecting blocks with different gradients that are stretched. The housing 1 is a hollow structure. The first connecting block 11 and the third connecting block 13 can be connected to an external device. The ring-shaped sheet 2 is connected to the second connecting block 12 by means of multi-point laser welding, which is located near the front portion of the second connecting block 12. The first connecting block 11 has a caliber larger than that of the second connecting block 12. The second connecting block 12 has a caliber larger than that of the third connecting block 13. The overall structure is stepped-shaped to ensure the connecting function of the connector. The ring-shaped sheet 2 surrounds the second connecting block 12. The plurality of shrapnel 3 are provided on the ring-shaped sheet 2. As shown in FIG. 2, the shrapnel 3 is provided on the top, the bottom as well as the left and right sides of the ring-shaped sheet 2. The mounting holes 4 are provided on the ring-shaped sheet 2. The two ends of the shrapnel 3 are connected at the two ends of the mounting holes 4. The shrapnel 3 is arched in the middle and has an overall arch shape. After the ring-shaped sheet 2 is welded to the housing 1, the shrapnel 3 is grounded when this structure is used as the connector. The shrapnel 3 is arranged in all four directions, which can achieve the protection of the connector. The side as well as the top and the bottom of the shrapnel 3 have consistent features to ensure the uniformity of forces when being in contact.

In this structure, the ring-shaped sheet 2 and the shrapnel 3 are an integrally molded structure. The ring-shaped sheet 2 is welded to the housing 1 to complete the installation. Compared to the integrally molded structure in the prior art, the splitting-type structure is easier for replacement and maintenance. The housing 1 is an integrally molded stretching structure, which has better shielding effect.

The above content is a further detailed description of the utility model in conjunction with specific preferred embodiments, and it cannot be considered that the specific implementation of the utility model is limited to these descriptions. For those skilled in the art to which the utility model pertains, without departing from the concept of the utility model, a plurality of simple deductions or substitutions can be made, which should be regarded as belonging to the protection scope of the utility model.

The invention claimed is:

1. A ring-shaped shrapnel structure of a High-Speed Modular Twisted Pair Data (H-MTD) male connector, comprising a housing, a ring-shaped sheet, and a shrapnel, wherein the housing is a stepped hollow structure, the ring-shaped sheet is detachably sleeved on a front end of the housing, and the shrapnel in an arch-shape protrudes and is arranged on the ring-shaped sheet.

2. The ring-shaped shrapnel structure of the H-MTD male connector according to claim 1, wherein the housing comprises a first connecting block, a second connecting block, and a third connecting block, one end of the first connecting block is connected to one end of the second connecting block, and one end of the third connecting block is connected to the other end of the second connecting block.

3. The ring-shaped shrapnel structure of the H-MTD male connector according to claim 2, wherein the first connecting block has a caliber larger than that of the second connecting block, and the second connecting block has a caliber larger than that of the third connecting block.

4. The ring-shaped shrapnel structure of the H-MTD male connector according to claim 3, wherein the ring-shaped sheet is connected to the second connecting block and arranged close to the third connecting block.

5. The ring-shaped shrapnel structure of the H-MTD male connector according to claim 3, wherein middles of the first connecting block, the second connecting block, and the third connecting block are intercommunicated.

6. The ring-shaped shrapnel structure of the H-MTD male connector according to claim 1, wherein the ring-shaped sheet is provided thereon with mounting holes, and two ends of the shrapnel are connected to two ends of the mounting holes, respectively.

7. The ring-shaped shrapnel structure of the H-MTD male connector according to claim 6, wherein the shrapnel is provided on a top, a bottom as well as left and right sides of the ring-shaped sheet.

8. The ring-shaped shrapnel structure of the H-MTD male connector according to claim 6, wherein the shrapnel is integrally molded with the ring-shaped sheet.

9. The ring-shaped shrapnel structure of the H-MTD male connector according to claim 1, wherein side walls of the housing are not formed with any mounting holes.

* * * * *